US009181121B2

(12) United States Patent
Sudo et al.

(10) Patent No.: US 9,181,121 B2
(45) Date of Patent: *Nov. 10, 2015

(54) METHOD FOR MANUFACTURING VITREOUS SILICA CRUCIBLE

(71) Applicant: SUMCO CORPORATION, Minato-ku, Tokyo (JP)

(72) Inventors: Toshiaki Sudo, Akita (JP); Eriko Suzuki, Akita (JP)

(73) Assignee: SUMCO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/297,314

(22) Filed: Jun. 5, 2014

(65) Prior Publication Data

US 2014/0283552 A1    Sep. 25, 2014

Related U.S. Application Data

(62) Division of application No. 13/335,892, filed on Dec. 22, 2011, now abandoned.

(30) Foreign Application Priority Data

Dec. 31, 2010    (JP) ................... 2010-294630

(51) Int. Cl.
  *C03B 19/09*    (2006.01)
  *G01J 5/60*    (2006.01)
  (Continued)

(52) U.S. Cl.
  CPC ............ *C03B 19/095* (2013.01); *G01J 5/0022* (2013.01); *G01J 5/0037* (2013.01); *G01J 5/0862* (2013.01); *C03B 2201/02* (2013.01)

(58) Field of Classification Search
  CPC ...... C03B 15/10; C03B 35/002; C03B 19/01; C03B 19/066; H05B 7/085

USPC ............... 65/17.3–17.6; 374/2, 121
See application file for complete search history.

(56) References Cited

U.S. PATENT DOCUMENTS 3,611,805 A  * 10/1971 Hishikari ................... 374/127
4,201,563 A    5/1980 Bricker et al.
(Continued)

FOREIGN PATENT DOCUMENTS

JP    S61194323 A    8/1986
JP    S63107889 A    5/1988
(Continued)

OTHER PUBLICATIONS

Klaus-Dieter Gruner, Principles of Non-Contact Temperature Measurement, Raytek® GmbH Dec. 2003 pp. 1-32 as viewed at http://support.fluke.com/raytek-sales/Download/Asset/IR_THEORY_55514_ENG_REVB_LR.PDF on Jan. 27, 2014.*
(Continued)

*Primary Examiner* — Jodi C Franklin
(74) *Attorney, Agent, or Firm* — Law Office of Katsuhiro Arai

(57) ABSTRACT

Accurate temperature measurement during manufacturing a vitreous silica crucible is enabled. The present invention provides an apparatus for manufacturing a vitreous silica crucible including: a mold for forming a silica powder layer by supplying silica powder therein; an arc discharge unit having carbon electrodes and a power supply unit and for heating and fusing the silica powder layer by arc discharge; and a temperature measurement unit for measuring temperature of a fused portion in the mold, wherein the temperature measurement unit is an radiation thermometer for measuring temperature by detecting radiation energy of a wavelength of 4.8 to 5.2 μm.

4 Claims, 12 Drawing Sheets

(51) Int. Cl.
*G01J 5/00* (2006.01)
*G01J 5/08* (2006.01)

(56) References Cited

U.S. PATENT DOCUMENTS

| | | | |
|---|---|---|---|
| 4,924,073 A * | 5/1990 | Chiba | 219/413 |
| 5,174,801 A | 12/1992 | Matsumura et al. | |
| 5,551,966 A * | 9/1996 | Hirose et al. | 65/377 |
| 6,187,090 B1 | 2/2001 | Maeda et al. | |
| 6,283,630 B1 * | 9/2001 | Yazawa | 374/128 |
| 6,543,257 B1 * | 4/2003 | Koaizawa et al. | 65/489 |
| 7,195,669 B2 * | 3/2007 | Wakabayashi et al. | 117/17 |
| 2002/0185061 A1 * | 12/2002 | Yamaji et al. | 117/213 |
| 2005/0000404 A1 * | 1/2005 | Kishi et al. | 117/13 |
| 2006/0283378 A1 * | 12/2006 | Kishida et al. | 117/20 |
| 2009/0084308 A1 * | 4/2009 | Kishi et al. | 117/13 |
| 2009/0165700 A1 * | 7/2009 | Kishi et al. | 117/13 |
| 2009/0173276 A1 | 7/2009 | Satou | |
| 2009/0301385 A1 * | 12/2009 | Kuroki et al. | 117/13 |
| 2010/0005836 A1 * | 1/2010 | Kishi et al. | 65/124 |
| 2010/0071613 A1 * | 3/2010 | Kishi et al. | 117/208 |
| 2010/0162760 A1 * | 7/2010 | Fujita et al. | 65/65 |
| 2010/0162947 A1 * | 7/2010 | Harada et al. | 117/206 |
| 2010/0165321 A1 * | 7/2010 | Hayashida et al. | 356/3.09 |
| 2010/0244311 A1 * | 9/2010 | Kishi et al. | 264/219 |
| 2011/0079047 A1 * | 4/2011 | Suzuki et al. | 65/29.13 |
| 2012/0037069 A1 * | 2/2012 | Sudo et al. | 117/208 |
| 2012/0167623 A1 * | 7/2012 | Sudo et al. | 65/17.3 |
| 2012/0167624 A1 * | 7/2012 | Sudo et al. | 65/17.3 |
| 2012/0167625 A1 * | 7/2012 | Sudo et al. | 65/17.3 |
| 2012/0167627 A1 * | 7/2012 | Sudo et al. | 65/29.1 |
| 2012/0167628 A1 * | 7/2012 | Sudo et al. | 65/29.1 |
| 2012/0272687 A1 * | 11/2012 | Sudo et al. | 65/144 |
| 2012/0318021 A1 * | 12/2012 | Sudo et al. | 65/29.19 |

FOREIGN PATENT DOCUMENTS

| | | |
|---|---|---|
| JP | 08169798 A | 7/1996 |
| JP | 2933404 B | 8/1999 |
| JP | 2000019019 A | 1/2000 |
| JP | 2001089171 A | 4/2001 |
| JP | 2002154890 * | 5/2002 |
| JP | 2002154890 A | 5/2002 |
| JP | 2002154894 A | 5/2002 |
| JP | 2003243151 A | 8/2003 |
| JP | 2010180123 A | 8/2010 |
| JP | 2011088762 A | 5/2011 |
| JP | 2012148938 A | 8/2012 |
| WO | 2012098824 A1 | 7/2012 |

OTHER PUBLICATIONS

Watabe JP 20020528 Translated by: The McElroy Translation Company United States Patent and Trademark Office Washington, D.C. Oct. 2013.*

"Les Pyrometres Infrarouge Sans Contact", Mesures Regulation Automatisme, CFE. Paris, FR, No. 706, Jun. 1, 1998, pp. 88-94, XP000869136, ISSN: 0755-219X.

Extended European Search Report (EESR) mailed Jul. 13, 2012, issued for corresponding Application No. EP11195999.5.

Korea office action, mailed on Apr. 26, 2013, issued for a counterpart Korean Application No. 520040074593.

Klaus-Dieter Gruner, Principles of Non-Contact Temperature Measurement, Raytek GmbH, Dec. 2003, pp. 1-32, Raytek Corporation, Santa Cruz, CA USA.

* cited by examiner

METHOD FOR MANUFACTURING VITREOUS SILICA CRUCIBLE

CROSS-REFERENCE TO RELATED APPLICATION

This application is related to Japanese Patent Application No. 2010-294630 filed on Dec. 31, 2010, whose priority is claimed and the disclosure of which is incorporated by reference in its entirety.

BACKGROUND OF THE INVENTION

1. Field of the Invention

The present invention relates to a method and apparatus for manufacturing a vitreous silica crucible, and in particular relates to a technique suitable for controlling the inner surface property of a vitreous silica crucible used for pulling a silicon single crystal.

2. Description of the Related Art

A silicon single crystal has been manufactured by the Czochralski method (the CZ method) using a vitreous silica crucible. In this method, polycrystalline silicon raw material is melted and retained in the vitreous silica crucible, a seed crystal of silicon single crystal is dipped into the silicon melt, and the seed crystal is gradually pulled while rotating it, to produce a silicon single crystal by use of the seed crystal as a core.

The vitreous silica crucible used in this method has two-layer structure including an outer layer containing a number of bubbles and a transparent inner layer. It is known that the property of the crucible inner surface which contacts silicon melt while pulling a single crystal influences the property of the obtained silicon single crystal, and thus influences the yield of silicon wafers which are the final products.

Thus, there is known a vitreous silica crucible having structure of an inner layer made of synthetic vitreous silica and an outer layer made of natural vitreous silica.

For example, when silicon is melted in a vitreous silica crucible and a single crystal is pulled therefrom, melt surface vibration occurs and thus seeding of a seed crystal becomes difficult. In this case, the melt surface vibration prevents pulling of a silicon single crystal or prevents single crystallization. The problem of the melt surface vibration becomes more eminent as the diameter of the silicon crystal increases. Thus, it has been further demanded to improve the inner surface property of the vitreous silica crucible. JP-A-2002-154894 discloses one method of coping with this problem.

Furthermore, in order to obtain a wafer having a diameter of 300 mm or more, i.e. approx. 450 mm, it has been demanded to increase the diameter of a silicon single crystal. This demand elongates the time for pulling a single crystal, and thus elongates the time during which the crucible inner surface contacts silicon melt of 1400 deg. C. or more. This causes the following problem.

When the time for pulling is elongated, the contact time of the crucible inner surface with silicon melt is also elongated. In this case, the crucible inner surface reacts with silicon melt, to cause crystallization in the surface or a shallow layer from the surface of the crucible inner surface. The reaction causes ring-shaped brown cristobalite (hereinafter, the ring-shaped cristobalite is referred to as "brown ring"). A cristobalite layer is not formed in the inside of the brown ring, or if any, the cristobalite layer is a thin layer. The brown ring increases the area as the increase of the operation time, and the adjacent brown rings merge and grow. Finally, the center of the brown ring is corroded to expose irregular vitreous silica corroded surface.

When tiny pieces of vitreous silica detaches from the vitreous silica corroded surface, dislocation is more likely to occur in the silicon single crystal, and thus deteriorates the single crystallization yield. In particular, in order to grow a silicon single crystal for manufacturing a wafer having a diameter of 300 mm, it is necessary to continue the operation of the CZ method for 100 hours or more, and thus the vitreous silica corroded surface is more likely to appear.

It is considered that the aforementioned brown ring is generated from a core which is a tiny scratch on the vitreous silica surface, a crystalline residual portion which is an unfused portion of material silica powder, or a defect of vitreous silica structure. It is considered that the number of the brown rings can be reduced by maintaining a good surface state of vitreous silica, or reducing the crystalline residual portion by fusing silica powder at higher temperature and for a longer time in the vitreous silica crucible manufacturing process. Furthermore, as described in JP-B-2811290 and JP-B-2933404, amorphous synthetic silica powder can be used as material silica powder for forming the inner surface.

Synthetic vitreous silica made of amorphous synthetic silica powder contains impurities in an extremely small amount, and thus the use of synthetic silica powder can reduce the number of brown rings. However, the crucible having an inner layer of synthetic vitreous silica has a drawback in that melt surface vibration is more likely to occur when polysilicon is melted in the crucible having an inner layer of synthetic vitreous silica than a crucible having an inner layer made of natural vitreous silica. The vibration is in particular observed from a seeding process to a shoulder formation process, and at initial stage of pulling a first half of the body of a single crystal. Therefore, the melt surface vibration necessitated longer time for seeding, disturbed crystallization, and necessitated meltback, which led to drop in the productivity.

Furthermore, JP-A-2001-89171 discloses, in the embodiment, an apparatus for manufacturing a vitreous silica crucible by the rotating mold method carried out by arc fusing. This document describes that the apparatus is provided with a means to prevent mix-in of carbon, and thus it is possible to manufacturing a vitreous silica crucible having an inner surface with reduced impurities. Furthermore, JP-B-3926167 discloses, in the embodiment, an apparatus for manufacturing a vitreous silica crucible, which is provided with an arc fusing apparatus having a radiation thermometer disposed above the arc electrodes.

SUMMARY OF THE INVENTION

In order to manufacturing a vitreous silica crucible having a desired inner surface property, it is considered that the fused state of silica powder needs to be controlled to be a specific state by controlling the inner surface temperature.

However, the temperature used in the JP-A-2001-89171 is over 2000 deg. C., which is a temperature higher than approx. 1500 deg. C. which is a temperature measured during operation in the field of the steel industry. Therefore, it is not possible to measure such high temperature during operation in the state of the art.

Furthermore, it is also not possible to measure the surface temperature of an object heated and fused near arc flame because the measurement condition is very severe. Therefore, it is difficult to control the temperature during manufacturing a vitreous silica crucible.

Furthermore, the amount of heat generation is controlled by controlling the voltage value in the conventional controlling method, but the voltage value is not stable and thus fluctuates during arc generation. In addition, the voltage value is largely varied by tiny disturbance generated during the arc generation. Therefore, according to the control based on the voltage value, it is difficult to match the movement of the electrodes with the change of the voltage value, and thus it is difficult to continue thermally stable arc generation.

Furthermore, JP-B-3926167 does not disclose temperature measurement data of the measuring object, and thus it is unknown whether it is actually possible to measure the temperature of the measuring object in a severe condition where arc flame is released. Even though the measurement is possible, the accurate temperature measurement is not easy. Thus, further improvement of the control of the manufacturing process of a vitreous silica crucible has been desired.

The present invention has been made in view of the aforementioned circumstances and intends to achieve the following purposes.
1. Enabling accurate temperature measurement during manufacturing a vitreous silica crucible.
2. Enabling control of the fused state of the material during manufacturing a vitreous silica crucible.
3. Enabling quality control of the manufactured vitreous silica crucible
4. Reducing variation of the product property.

The present invention provides an apparatus for manufacturing a vitreous silica crucible comprising:

a mold for forming a silica powder layer to manufacture a crucible by supplying silica powder therein;

an arc discharge unit having carbon electrodes and a power supply unit and for heating and fusing the silica powder layer by arc discharge; and a temperature measurement unit for measuring temperature of a fused portion in the mold, wherein the temperature measurement unit is an radiation thermometer for measuring temperature by detecting radiation energy of a wavelength of 4.8 to 5.2 μm.

According to the apparatus, the temperature near the surface of the silica powder layer which is fused in a stringent environment over 2000 deg. C. can be measured precisely in real time. Thus, the fused state required for manufacturing a vitreous silica crucible can be detected precisely and easily. The fused state can be precisely fed back to the manufacturing conditions, and thus more precise control of the manufacturing conditions is possible.

Here, the crucible properties which can be improved by the present invention mean factors which can influence properties of semiconductor single crystal pulled by use of the vitreous silica crucible. Such properties includes a vitrification state on an crucible inner surface, a bubble distribution and bubble size along a thickness direction, OH group content, impurities distribution, surface irregularity, and ununiformity of these factors along the crucible height direction.

A vitreous silica crucible is the only and important component which contacts silicon melt, and determines the yield and quality of a silicon single crystal. Depending on the bubble distribution and bubble size along the thickness direction, the bubbles rupture and vitreous silica pieces mix in silicon melt during pulling a silicon single crystal. When the vitreous silica pieces attach to a silicon single crystal ingot, the ingot can be polycrystallized. The vitreous silica crucible is easily crystallized to generate cristobalite depending on the OH group content, and the cristobalite detached from the vitreous silica crucible attaches an end of silicon single crystal to polycrystallize it. Furthermore, there's also possibility of lowering of viscosity of vitreous silica.

When impurities exist in the vitreous silica crucible, the impurities promote generation of spotty cristobalite on the inner surface of the vitreous silica crucible during pulling a single crystal. Thus-formed cristobalite detaches from the crucible, drops in silicon melt, and deteriorates the single crystallization yield of the pulled single crystals.

The temperature measurement unit may have a filter made of $BaF_2$ or $CaF_2$. The transmittance of such filter F is high for light having a specific range of wavelength which is radiated from the crucible inner surface, which is a measuring object. Therefore, by use of the filter F, the intensity of the light used for the temperature measurement can be strengthened.

Furthermore, the radiation thermometer may be provided on the outside of the furnace, and a window made of the filter made of $BaF_2$ or $CaF_2$ may be provided. In this case, it is possible to carry out temperature measurement by use of the radiation thermometer via the filter.

The range of the measuring temperature of the temperature measurement unit is preferred to be 400 to 2800 deg. C. In this case, the temperature of the material silica powder and the temperature of the fused state of the silica powder can be measured continuously in a broad range of 400 to 2800 deg. C. Therefore, it is possible to measure the temperature from the beginning to the end of the fusing, and to the end of the cooling, and thus it is possible to more precisely control the process, which is influential to the property of the vitreous silica crucible.

The radiant energy detecting position by the temperature measurement unit may be the corner portion of the vitreous silica crucible. In this case, the accuracy of the temperature measurement of the inner surface during manufacturing a vitreous silica crucible can be improved.

The present inventors have carried out temperature measurement at 6 positions of the bottom center position B, the bottom outward position B-R, the corner inward position R, the corner upper position R-W, the wall center position W1, and the wall upper position W2, as shown in FIG. 4, from the bottom center to the rim upper end of the inner surface of the vitreous silica crucible. As a result, the standard deviation of the measured temperature was the largest at the corner upper position R-W and the corner inward position R as shown in FIG. 5. Thus, it is possible to most accurately measure the variation of fusing temperature during manufacturing a crucible by measuring the temperature at the corner portion, in particular, the temperature at the corner upper position R-W. Therefore, it is possible to detect the temperature change which is small enough to be undetectable in the measurement of the other positions, and feed back the detected measurement result to the manufacturing conditions, and precisely control the crucible inner surface property.

When the corner portion, in particular, the corner upper position R-W is set as the temperature measurement position, it is possible to detect the thickness change of the corner portion as the temperature change which is caused by the gathering, during arc fusing, of fused vitreous silica from the wall portion by the gravity and from the bottom portion by the centrifugal force. This is not possible if the other positions are set as the temperature measurement position. Thus, it is possible to prevent the thickness of the corner portion from departing from the acceptable range by controlling the number of rotations of the mold, the amount of supplied power, the electrode position, the electrode relative position or the like based on the measured temperature change. Therefore, it is possible to manufacturing a vitreous silica crucible having a better dimension accuracy.

Furthermore, the apparatus may have a controller for controlling the fused state of vitreous silica by changing, based on the measurement result from the temperature measurement unit, any of the amount of current supplied to the carbon electrodes, the position of the carbon electrodes, the relative position of the mold and the carbon electrodes, and the position of the mold. In this case, it is possible to more precisely control the inner surface property of the manufactured vitreous silica crucible.

Here, the position of the carbon electrodes refers to the opening angle of the carbon electrodes, and the horizontal or height position of the electrode tips, and the direction to which the arc flame generated by the electrodes is thrown.

Furthermore, the relative position of the mold and the carbon electrodes refers to the relative position of the direction of the mold rotation axis and the direction of the electrode center, and the relative position of the mold and the height position of the electrode tips, and the relative position of the mold and the horizontal position of the electrode tips.

Furthermore, the mold position refers to, for example, the direction of the mold rotation axis.

The present invention provides a method of manufacturing a vitreous silica crucible comprising:

a silica powder supplying process of supplying silica powder into a mold for molding a crucible, to form a silica powder layer; and an arc fusing process of arc fusing the silica powder layer by arc discharge generated by carbon electrodes, wherein at least the arc fusing process include a temperature measuring process of measuring temperature of a fused portion in the mold by detecting radiation energy of a wavelength of 4.8 to 5.2 μm by a temperature measurement unit which is a radiation thermometer.

According to the method of manufacturing a vitreous silica crucible, the temperature measurement of fused silica is carried out just before the start of the arc fusing process to the start or the end of the cooling process, and thus the temperature near the surface of the silica powder layer which is fused in a stringent environment over 2000 deg. C. can be measured precisely in real time. Thus, the fused state required for manufacturing a vitreous silica crucible can be detected precisely and easily. The fused state can be precisely fed back to the current supply, and more precise control of the current supply is possible.

A problem originated from unevenness of the surface temperature was not recognized in manufacturing a crucible having an opening diameter of 22 inches (55.88 cm) or less. However, in manufacturing a larger crucible having an opening diameter of 23 inches (58.4 cm) to 40 inches (116 cm) or more, the unevenness of the surface temperature caused unevenness of the inner surface property of the crucible. However, according to the present invention, the temperature is measured in real time, and thus the unevenness of the temperature can be prevented, and thus it is possible to manufacture a vitreous silica crucible having a uniform inner surface property.

Furthermore, in the temperature measurement process, the temperature measurement unit may measure the temperature through a filter made of $BaF_2$ or $CaF_2$. In this case, the intensity of the light used for the temperature measurement is not weakened.

Furthermore, in the temperature measuring process, the range of the measuring temperature of the temperature measurement unit may be 400 to 2800 deg. C. In this case, the temperature of the material silica powder and the temperature of the fused state of the silica powder can be measured continuously in a broad range of 400 to 2800 deg. C.

Furthermore, in the temperature measuring process, the temperature measurement unit may detect the radiation energy at the corner portion. In this case, the accuracy of the temperature measurement improves, and it is possible to detect the change of the fused state which is undetectable in the measurement of the other positions.

Furthermore, in the temperature measuring process, the fused state of vitreous silica may be controlled by changing, based on the measurement result from the temperature measurement unit, any of the amount of current supplied to the carbon electrodes, the position of the carbon electrodes, the relative position of the mold and the carbon electrodes, and the position of the mold. In this case, it is possible to more precisely control the inner surface property of the manufactured vitreous silica crucible.

According to the present invention, it is possible to measure the temperature of vitreous silica during fusing in real time, and thus it is possible to prevent the problem that the thickness at the corner portion becomes too thick when the fusing temperature is too high or the problem that temperature change changes the parameters of the inner surface property so as to adversely affects pulling of a silicon single crystal. Therefore, according to the present invention, it is possible to manufacturing a vitreous silica crucible having a preferable property.

DESCRIPTION OF THE PREFERRED EMBODIMENTS

Hereinafter, an embodiment of a method of manufacturing a vitreous silica crucible, according to the present invention, will be explained with reference to drawings.

Figure 1:
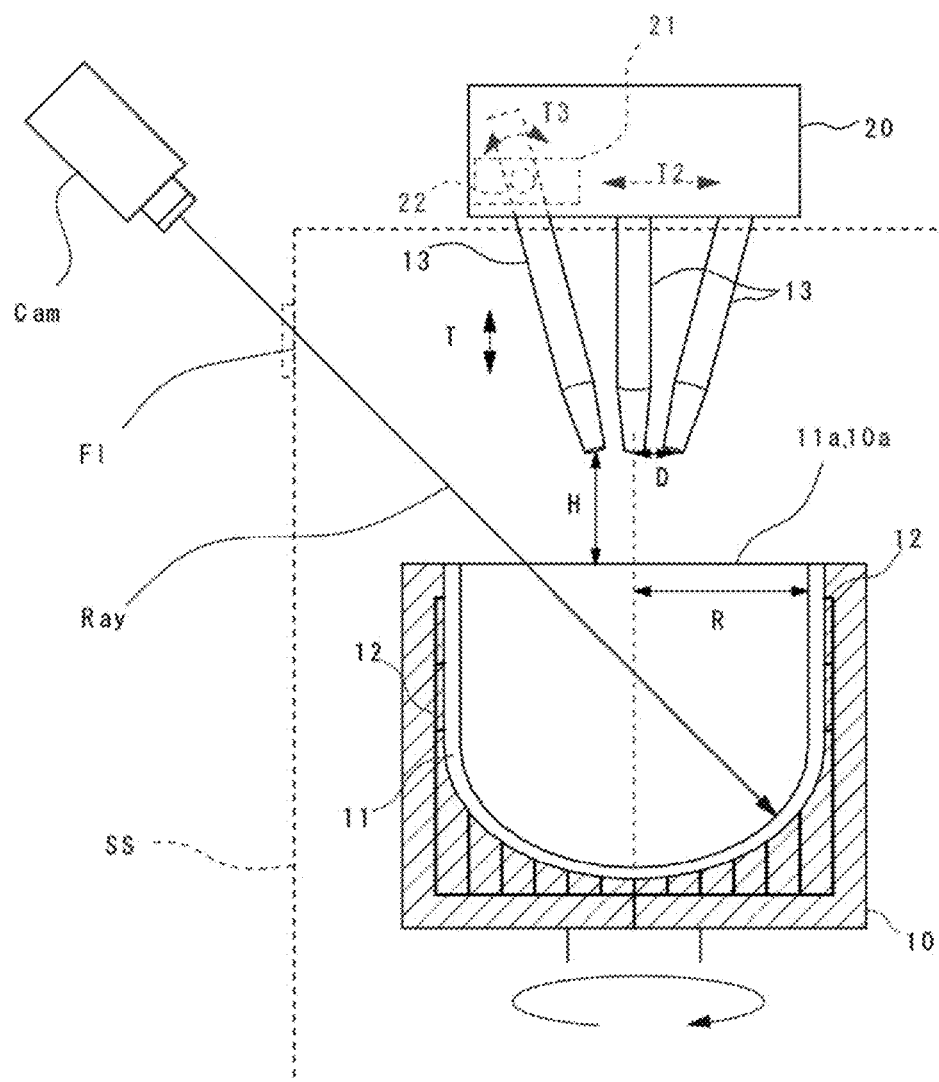
FIG. 1 is a schematic front view showing an embodiment of an apparatus for manufacturing a vitreous silica crucible, according to the present invention.

FIG. 1 is a schematic front view showing an apparatus for manufacturing a vitreous silica crucible, according to the present embodiment. Reference symbol 1 denotes the apparatus for manufacturing a vitreous silica crucible.

The apparatus 1 for manufacturing a vitreous silica crucible of the present embodiment includes a mold 10 which is rotatable by a rotation unit (not shown) and defines an outer shape of a vitreous silica crucible. Silica powder is supplied and deposited on the inner surface of the mold 10 to form a silica powder layer 11 with a predetermined thickness.

The mold 10 includes ventilation passages 12 which are open to the inside of the mold 10. The ventilation passages 12 are connected to a pressure-reducing unit (not shown). Carbon electrodes 13 connected to a power-supply unit (not shown) are provided above the mold as an arc discharge unit. The silica powder layer 11 can be heated by the are discharge unit. The configuration of the power supply unit is not in particular limited, and may be a power supply unit for an arc furnace, for example, described in JP-A-2007-317651.

The apparatus 1 includes a temperature measurement unit for measuring the temperature of the silica powder layer 11 to be fused in the mold 10, and a controller for controlling the vitreous silica fused state by changing any of the amount of current supplied to the carbon electrodes 13, the position of the carbon electrodes 13, the relative position of the mold 10 and the electrodes 13, and the position of the mold 10, based on the temperature measured by the temperature measurement unit.

The carbon electrodes 13 are vertically movable as shown by the arrow T by an electrode position setting unit 20, connected to the aforementioned controller, so that the height position H is adjustable. Furthermore, the opening angle of the carbon electrodes 13 and the interelectrode distance D shown by the arrow D are adjustable by the electrode position setting unit 20. Furthermore, the other relative position of the carbon electrodes 13 to the mold 10 is also adjustable by the electrode position setting unit 20.

The apparatus 1 is a high-output apparatus which can heat and fuse a nonconductive material (silica powder) by arc discharge between carbon electrodes 13 with an output range of 300 kVA to 12,000 kVA. The apparatus 1 includes a radiation thermometer Cam as the temperature measurement unit for measuring the temperature of the fused portion in the mold 10.

Figure 2A:
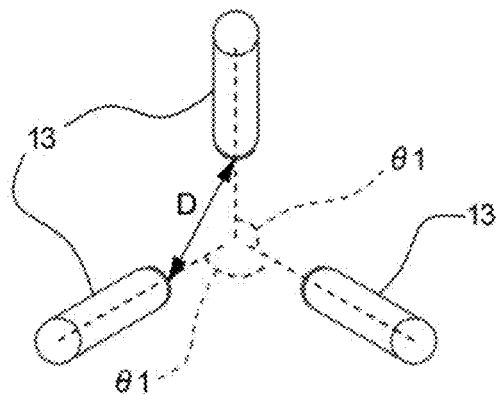
FIGS. 2(a) and 2(b) are a schematic plan view and a schematic side view, respectively, showing a position of carbon electrodes of FIG. 1
Figure 2B:
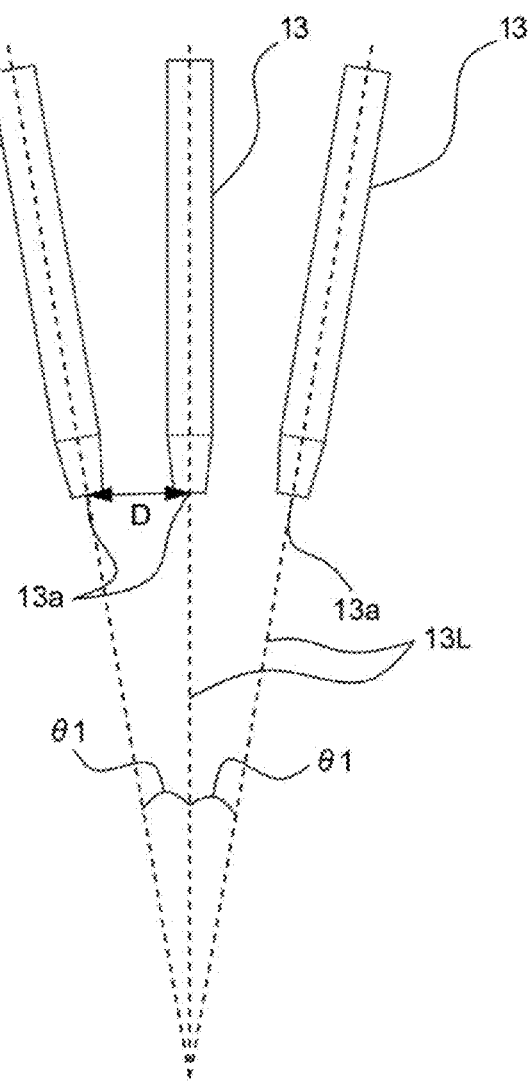

FIGS. 2(a) and 2(b) are a schematic plan view and a schematic side view, respectively, showing a position of carbon electrodes of FIG. 1.

The carbon electrodes 13 are of the same shape so that they are used to generate arc discharge in alternate current three phase (R phase, S phase, T phase). As shown in FIGS. 1 and 2, they are provided to form an inverse three-sided pyramid having a downwardly-directed tip. In addition, they are provided so that angles between axes 13L of the electrodes 13 are θ1. The number, a position, and a power supply method are not limited to the above-mentioned configuration, and other configurations may be employed.

Carbon electrodes 13 may be made of highly-pure carbon particles with a particle diameter of 0.3 mm or less, preferably 0.1 mm or less, more preferably 0.05 mm or less. When the density is 1.30 g/cm$^3$ to 1.80 g/cm$^3$ or 1.30 g/cm$^3$ to 1.70 g/cm$^3$, the difference in density between the carbon electrodes 13 may be made 0.2 g/cm$^3$ or less, and thus the carbon electrodes 13 can be made highly uniform.

As shown in FIG. 1, the electrode position setting unit 20 includes a supporting unit 21, a horizontal movement unit, and a vertical movement unit. The supporting unit 21 supports the carbon electrode 13 so that the interelectrode distance D is adjustable. The horizontal movement unit enables horizontal movement of the supporting unit 21. The vertical movement unit enables vertical movement of the supporting units 21 and the horizontal movement units together.

In the supporting unit 21, the carbon electrode 13 is rotatably supported at an angle setting axis 22, and there is provided a rotation unit to control a rotation angle of the angle setting axis 22.

The interelectrode distance D between the carbon electrodes 13 can be adjusted by, as shown by the arrows in FIG. 1, changing the angle of the carbon electrodes 13 by the rotation unit and the horizontal position of the supporting unit 21 by the horizontal movement unit. Furthermore, the height position of the electrode tip 13a with respect to the upper end position of the silica powder layer 11 (i.e. the upper end position of the opening of the mold 10) can be adjusted by changing the height position of the supporting unit 21 by the vertical movement unit.

In FIG. 1, only the carbon electrode 13 at the left end is supported by the supporting unit 21 and so on. However, other carbon electrodes are also supported by the same structure. A height of each of the carbon electrodes 13 is separately controllable. The apparatus 1 includes a temperature measurement unit for measuring the temperature of the silica powder layer 11 to be fused in the mold 10. The radiation thermometer Cam as the temperature measurement unit is provided on the outer side of the partition wall SS. The partition wall SS separates, from the outer side, the inner side where the arc discharge is carried out. The radiation thermometer Cam includes an optical system for condensing radiation energy light from the measuring object such as the fused portion through the filter F1 covering a window provided on the partition wall SS, a spectroscopic unit for obtaining a spectrum for the condensed light, and a detection element for detecting light related to the measuring object from the spectrum. The radiation thermometer Cam is connected to a controller for receiving necessary signals such as an analog output signal of the detection element or a setting signal from a setting unit to carry out calculation from the signals to measure the temperature.

The radiation thermometer Cam detects the radiation energy light from the surface of the silica powder layer 11 which is in the solid or fused state, and measures the temperature based on the measurement result. For example, the radiation thermometer Cam condenses the radiation energy light via the optical system such as a lens, obtains a spectrum for the condensed light by the spectroscopic unit, and detects light of a predetermined wavelength from the spectrum.

The analog output signal of the detection element of the radiation thermometer Cam is divided by the wavelength by a synchronous detector, amplified by an amplifier. Thereafter, the signal is transmitted to a controller (CPU) via a multi-channel, low resolution, and small bit AD converter. The signal is subjected to arithmetic processing in the CPU to produce a desired temperature signal. Thereafter, the temperature signal can be outputted to a display unit such as a LCD display. Furthermore, the temperature signal can be outputted to the controller of the vitreous silica crucible manufacturing apparatus, and the temperature information is used for feedback control to control the manufacturing conditions.

The radiation thermometer Cam as the temperature measurement unit has a range of measuring temperature of 400 to 2800 deg. C., and can detect the radiation energy of a wavelength of 4.8 to 5.2 μm to measure the temperature. The wavelength may be 4.8, 4.9, 5.0, 5.1, or 5.2 μm, or it can be in the range between two values of the values exemplified here.

The measurement diameter of the radiation thermometer Cam is not in particular limited, but may be 100, 50, 40, or 30 mm or less. When the measurement diameter is small, it is easier to measure the accurate temperature of the fused portion, and thus smaller measurement diameter is better, and the diameter of 30 mm or less is in particular preferable. The range of the measuring temperature may be in the range of any two values of 400, 700, 1000, 1500, 2000, 2500, and 2800 deg. C.

Figure 3:
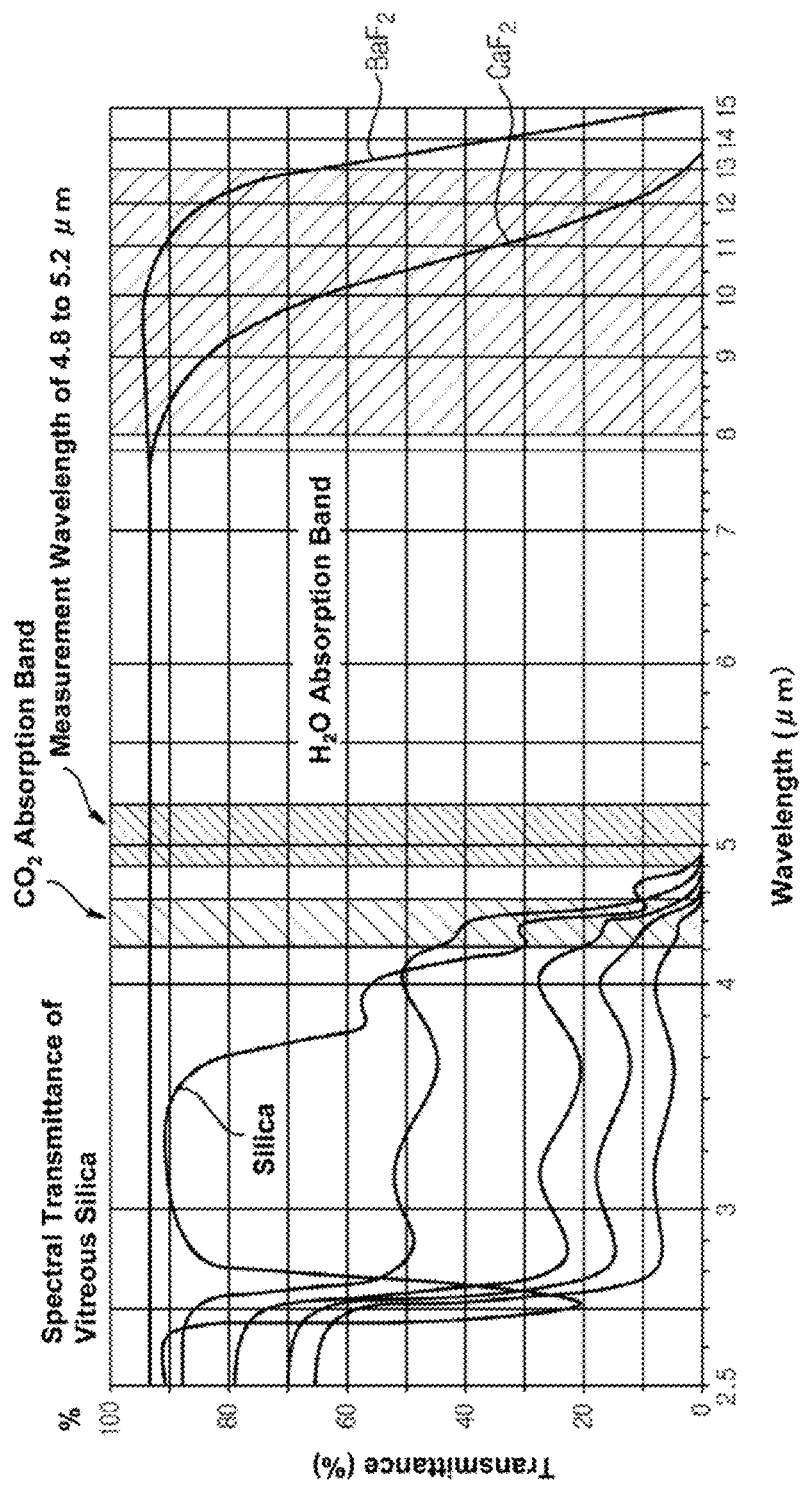
FIG. 3 is a graph showing the relationship between the spectral transmittance and the wavelength.

FIG. 3 is a graph showing the relationship between the spectral transmittance and the wavelength.

The radiation thermometer Cam of the present embodiment may have a range of measuring temperature of 400 to 2800 deg. C. This range indicates that the range covers the temperature range which can influence the crucible property in manufacturing a vitreous silica crucible. The temperature lower than 400 deg. C. is not very much related to the crucible property, and thus it is not meaningful to measure such temperature. The temperature higher than 2800 deg. C. requires a special apparatus for measurement, and thus it is costly to measure such temperature, and in addition, such temperature is above the temperature of normal manufacturing.

When the measurement wavelength of the radiation thermometer Cam of the present embodiment is within the aforementioned range, the absorption by $CO_2$ which can be generated from the carbon electrodes 13 during the arc discharge does not disturb the temperature measurement because the absorption band of $CO_2$ is in a wavelength of 4.2 to 4.6 μm. Furthermore, $H_2O$ contained in the air which is an ambient atmosphere during manufacturing a vitreous silica crucible has an absorption band of 5.2 to 7.8 μm, and thus the absorption by $H_2O$ does not disturb the temperature measurement.

The temperature measurement unit may have a filter F1 made of $BaF_2$ or $CaF_2$. When the filter F made of $BaF_2$ or $CaF_2$ is used, it is preferred not to use a wavelength of 8.0 to 14 μm for measurement because the transmittance of $BaF_2$ or $CaF_2$ is low for such wavelength. Therefore, it is possible to prevent the drop of the transmittance and enhance the accuracy of temperature measurement by not using such wavelength.

By the way, the transmittance of commonly manufactured silicate glass is high for infrared light having a wavelength of approx. 2.5 μm or less, but becomes much lower for light having a longer wavelength because of the absorption by vibration of Si—O bond. The transmittance of glass not containing Si—O bond is higher for infrared light than silicate glass, but such glass is poor at the stability and chemical durability, and thus not practical.

Fluoride glass has high transmittance for light of a broad wavelength from ultraviolet to infrared, and has high stability and chemical durability. Therefore, the use of the filter F made of $BaF_2$ or $CaF_2$ enables accurate measurement.

The radiant energy detecting position by the temperature measurement unit of the present embodiment may be the corner portion of the vitreous silica crucible. The corner portion is most likely to be deformed by the gathering of vitreous silica during manufacturing a vitreous silica crucible, and thus the temperature variation of the corner portion tends to be large. Therefore, it is possible to more precisely control the inner surface property of the crucible by controlling the temperature of the corner portion, and thus it is possible to manufacture a vitreous silica crucible having a better property. The deformation of the corner portion tends to occur by the gathering of fused vitreous silica from the wall portion by the gravity and from the bottom portion by the centrifugal force.

Figure 4:
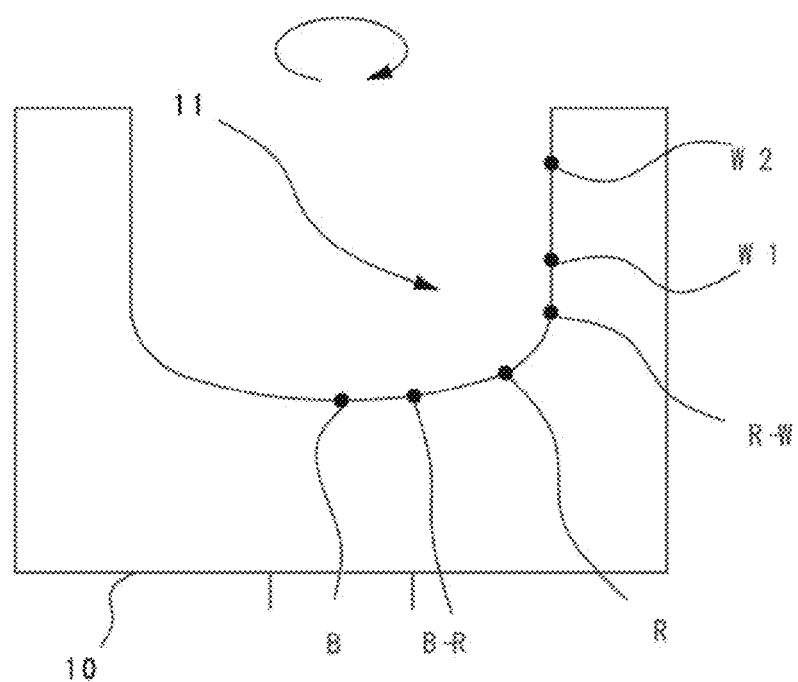
FIG. 4 is a sectional view showing the relationship between the mold and the temperature measuring point.

FIG. 4 is a sectional view showing the relationship between the mold and the temperature measuring point.

Figure 5:
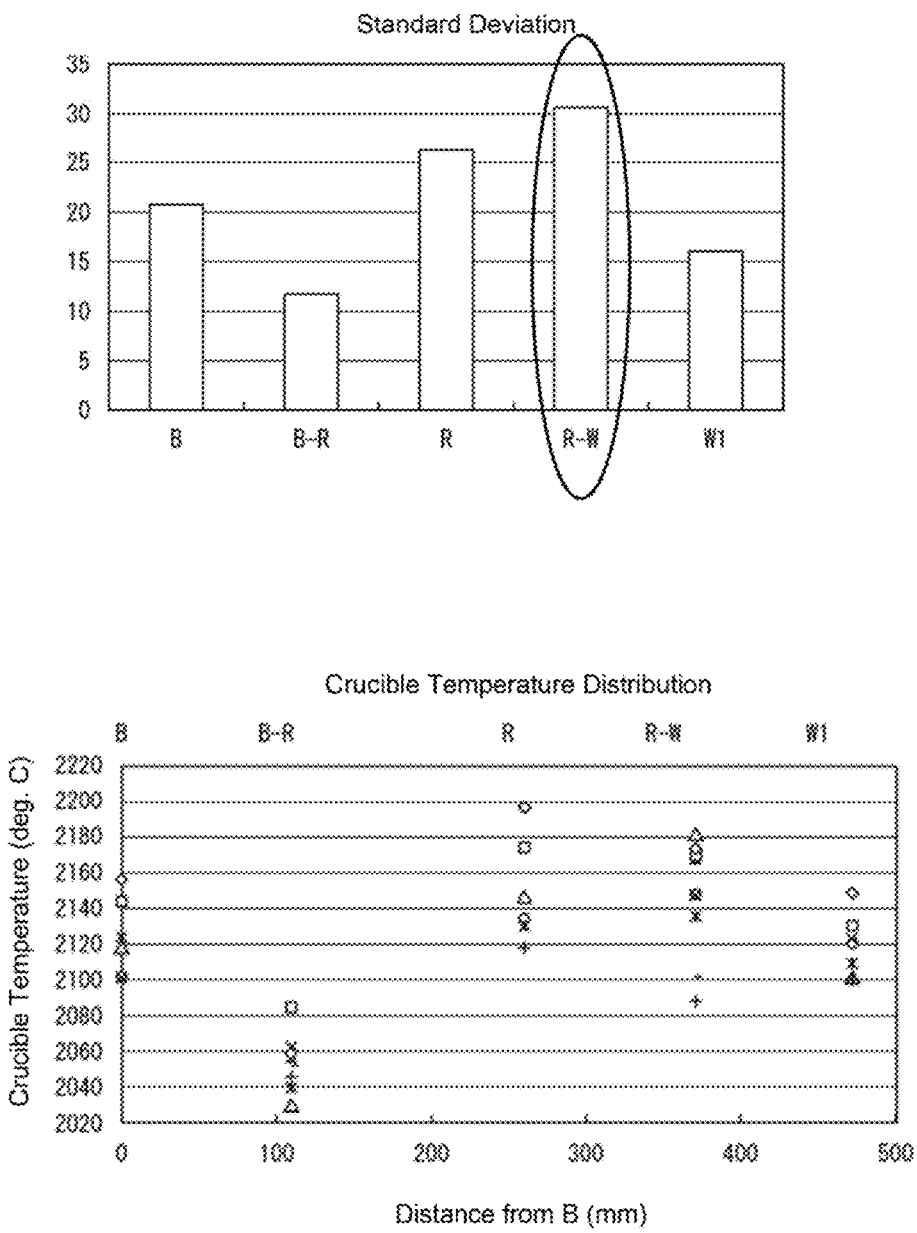
FIG. 5 is a graph showing the variation of the temperature depending on temperature measuring points.

Temperature measurement was carried out at 6 positions of the bottom center position B, the bottom outward position B-R, the corner inward position R, the corner upper position R-W, the wall center position W1, and the wall upper position W2, as shown in FIG. 4, from the bottom center to the rim upper end of the inner surface of the vitreous silica crucible. As a result, the standard deviation of the measured temperature was the largest at the corner upper position R-W and the second largest at the corner inward position R as shown in FIG. 5. Thus, it is possible to more accurately measure the variation of fusing temperature during manufacturing a crucible by measuring the temperature at the corner portion, in particular, the temperature at the corner upper position R-W or the corner inward position R. Therefore, it is possible to detect the temperature change which is small enough to be undetectable in the measurement of the other positions, and feed back the detected measurement result to the manufacturing conditions, and precisely control the crucible inner surface property.

The wall thickness at the corner portion tends to increase because fused silica comes from the wall portion by the gravity and it comes from the bottom portion by the centrifugal force of the mold 10, when the heating temperature is increased.

In the present specifications, the corner portion is a portion smoothly connecting the cylindrical wall portion and the bottom portion having a constant curvature. In other words, the corner portion is a portion from the point where the constant curvature at the bottom portion starts to change to the point where the curvature matches that of the wall portion (which is infinite when the wall portion is cylindrical).

The bottom outward position B-R is a center position between the bottom center position B and the bottom edge. The corner inward position R is a point where the curvature at the bottom center position B starts to change. The corner upper position R-W is a border between the corner portion and the wall portion, and the change of the curvature finishes at the corner upper position R-W. The wall center position W1 is a center position between the corner portion and the wall upper end (rim upper end) position W2. When the crucible diameter is 22 inches to 32 inches (0.5588 m to 0.8128 m), the constant curvature of radium at the bottom portion is 550, 650, 750, 850, or 900 mm, or it can be in the range between two values of the values exemplified here.

The observation line connecting the radiation thermometer and the measuring point can be separated by 100 mm or more from the carbon electrodes. In this case, the arc flame and electrode radiation generated near the carbon electrodes do not seriously disturb the accuracy of the temperature measurement.

When the distance from the observation line to the carbon electrodes 13 is smaller than 100 mm, the accuracy of the temperature measurement lowers. When the distance is larger than the crucible radium, the distance is too large for accurate temperature measurement of a specific measuring point M. In addition, the amount of radiation from the measuring point to the radiation thermometer becomes insufficient, and thus the temperature measurement becomes inaccurate.

As silica powder, synthetic silica powder is primarily used for the inner face layer and natural silica powder is primarily used for the outer layer.

Here, synthetic silica powder means powder made of synthetic silica, and is a chemically synthesized and manufactured material. Synthetic silica powder is amorphous. Because raw material of synthetic silica is gas or liquid, it can be easily purified, and thus synthetic silica powder can be more highly-pure than natural silica powder. Raw material of synthetic silica may be gaseous raw material such as silicon tetrachloride, or may be liquid raw material such as silicon alkoxide. In synthetic silica powder, the amount of any metal impurity can be made 0.1 ppm or less.

Synthetic silica powder made by the sol-gel method usually includes 50 to 100 ppm of residual silanol. The amount of silanol of synthetic silica powder made by silicon tetrachloride as raw material can be controlled in a broad range of 0 to 1000 ppm, and usually includes chlorine in a concentration of approx. 100 ppm or more. When alkoxide is used as raw material, synthetic vitreous silica not including chlorine can be easily obtained.

Synthetic silica powder made by the sol-gel method includes silanol in a concentration of 50 to 100 ppm before fusing as mentioned above. When the powder is vacuum-fused, silanol is removed and the amount of silanol in the obtained vitreous silica is reduced to approx. 5 to 30 ppm. It should be noted that the amount of silanol changes depending on fusing conditions such as fusing temperature, elevated temperature etc. Natural vitreous silica obtained by fusing natural silica powder in the same conditions includes silanol in a concentration of less than 5 ppm.

In general, synthetic vitreous silica (vitreous silica obtained by fusing synthetic silica powder) is said to have lower high-temperature viscosity than natural vitreous silica (vitreous silica obtained by fusing natural silica powder). One of the reasons for the lower high-temperature viscosity is that silanol or halogen destroys a mesh structure of $SiO_4$ tetrahedron.

Synthetic vitreous silica has high light transmissibility for ultraviolet with a wavelength of approx. 200 nm or less. This synthetic vitreous silica has similar property to synthetic vitreous silica made of silicon tetrachloride as raw material and for ultraviolet optics.

Unlike natural vitreous silica, when synthetic vitreous silica is excited by ultraviolet light with a wavelength of 245 nm, fluorescence peaks are not observed in the obtained fluorescence spectrum.

Furthermore, natural silica powder means powder made of natural silica. Natural silica means a material obtained by the processes of digging out naturally-existing quartz raw stones followed by crushing and purification etc. Natural silica powder is made of α-quartz crystal. Natural silica powder contains Al and Ti in a concentration of 1 ppm or more. Natural silica powder contains other metal impurities in a higher concentration than synthetic silica powder. Natural silica powder barely contains silanol. Natural vitreous silica includes silanol in a concentration of less than 5 ppm.

When light transmissibility of natural vitreous silica is measured, light transmissibility rapidly decreases as the wavelength becomes shorter than 250 nm and light transmissibility is very small for light with a wavelength of 200 nm. This is mainly because of Ti contained in a concentration of about 1 ppm as impurities. An absorption peak is observed at around 245 nm. This peak is assigned to oxygen deficiency defects.

When natural vitreous silica is excited by ultraviolet light with a wavelength of 245 nm, fluorescence peaks at wavelengths of 280 nm and 390 nm are observed. These peaks are assigned to oxygen deficiency defects in the vitreous silica.

Whether vitreous silica is natural or synthetic may be determined by measuring either impurities concentrations, the amount of silanol, light transmissibility, or a fluorescence spectrum obtained by exciting the vitreous silica with ultraviolet light with a wavelength of 245 nm.

In the present invention, silica powder is used as raw material. Silica powder may be either synthetic silica powder or natural silica powder. Natural silica powder may be quartz powder, or powder of a well-known raw material for a vitreous silica crucible such as quartz crystal, quartz sand etc. Furthermore, silica powder may be crystalline, amorphous, or vitreous.

Next, the method of manufacturing a vitreous silica crucible of the present embodiment will be explained with reference to the drawings.

Figure 6:
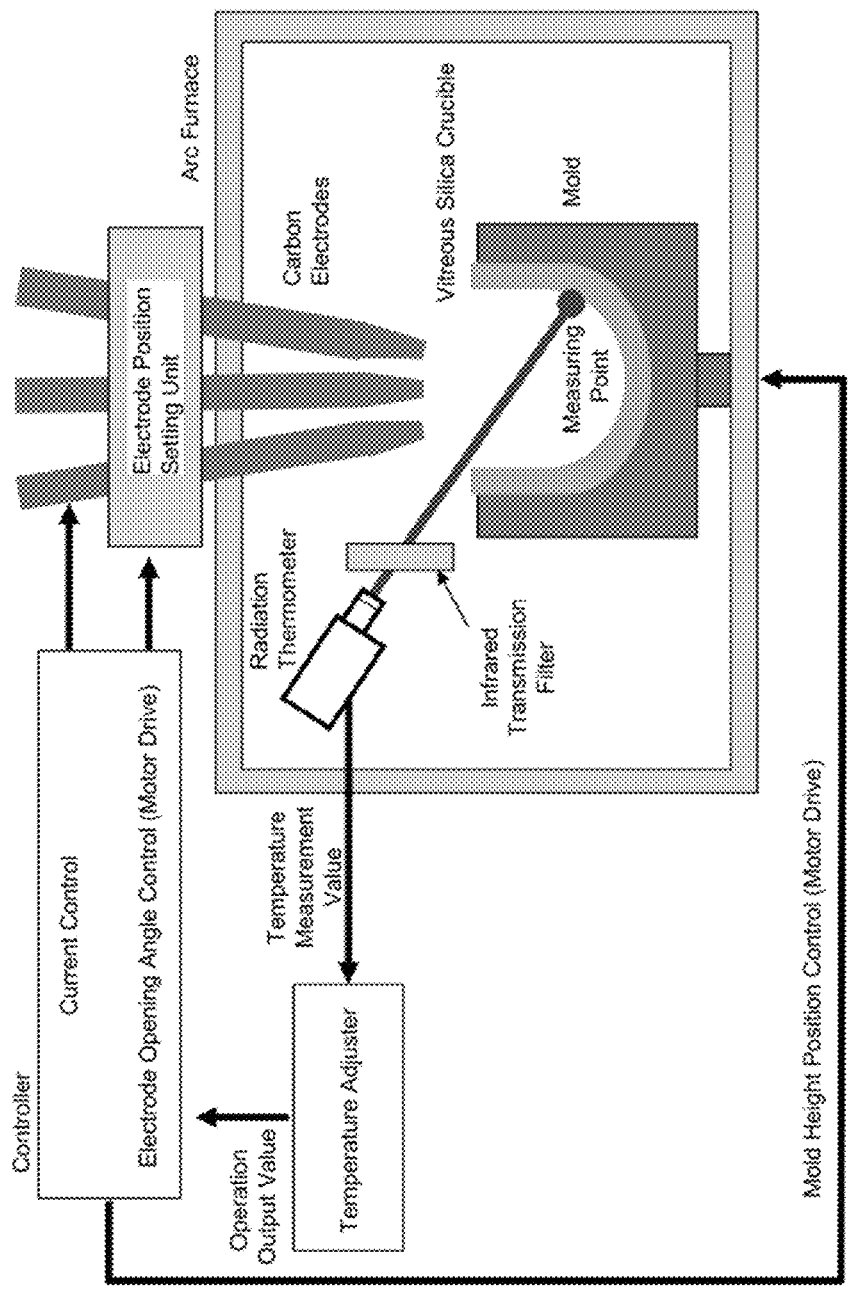
FIG. 6 is a conceptual diagram showing a method of feedback control of crucible temperature.

FIG. 6 is a conceptual diagram showing a method of feedback control of crucible temperature, in the method of manufacturing a vitreous silica crucible, according to the present embodiment. The method of feedback control is carried out by the apparatus having carbon electrodes, a radiation thermometer, an infrared transmission filter, a temperature adjuster, and a controller, and an electrode position setting unit.

The method of feedback control includes processes of: generating arc discharge by the carbon electrodes to heat and fuse the nonconductive object (silica powder) in the mold, and detecting, through an infrared transmission filter, radiation energy having a wavelength of 4.8 to 5.2 μm which is radiated from the heated and fused portion (a measuring point). In the radiation thermometer, the radiation energy is condensed by an optical lens or the like, and the condensed energy is converted to a temperature measurement value which is proportional to the amount of the radiation energy, and the value is outputted to a temperature adjuster as voltage or current. The temperature adjuster compares the temperature measurement value with the optimal fusing temperature, converts it into an appropriate operation output value, and outputs the value to a controller. The controller controls the current value, the opening angle of the electrodes, and the height of the mold, based on the operation output value. In this way, any of the current supplied to the carbon electrodes, the position of the carbon electrodes, the relative position of the mold and the carbon electrodes, and the position of the mold can be changed.

The optimal fusing temperature in the present specification can be determined empirically, or by a computational method such as simulation. For example, the time-course temperature data of the inner surface of the silica powder layer during heating and fusing the silica powder layer for manufacturing a crucible is acquired by use of the radiation thermometer for many crucibles. Then, by use of each of these crucibles, a silicon single crystal is pulled at 1400 deg. C. or more by the CZ method. Then, from the time-course temperature data for the crucible which has enabled stable manufacturing of a high-quality silicon single crystal by the CZ method, the time-course optimal temperature of the inner surface of the silica powder layer during heating and fusing the silica powder layer can be determined empirically, or by a computational method.

Figure 7:
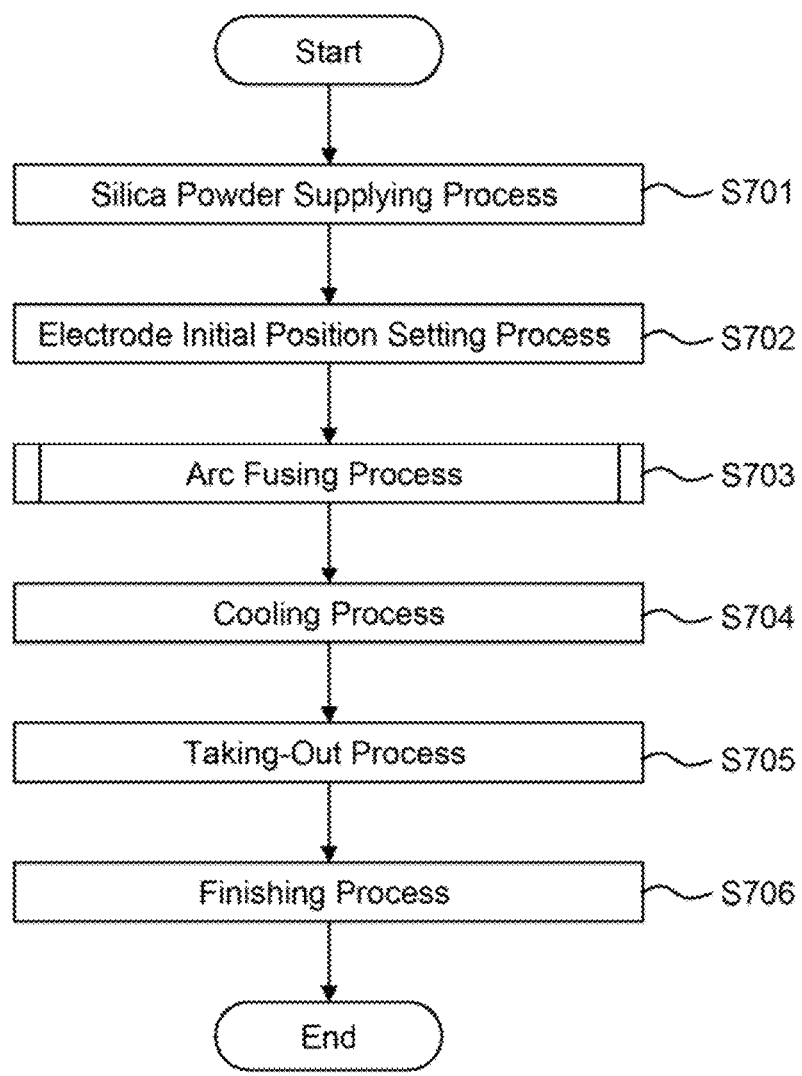
FIG. 7 is a flowchart showing an embodiment of a method of manufacturing a vitreous silica crucible, according to the present invention.
Figure 8:
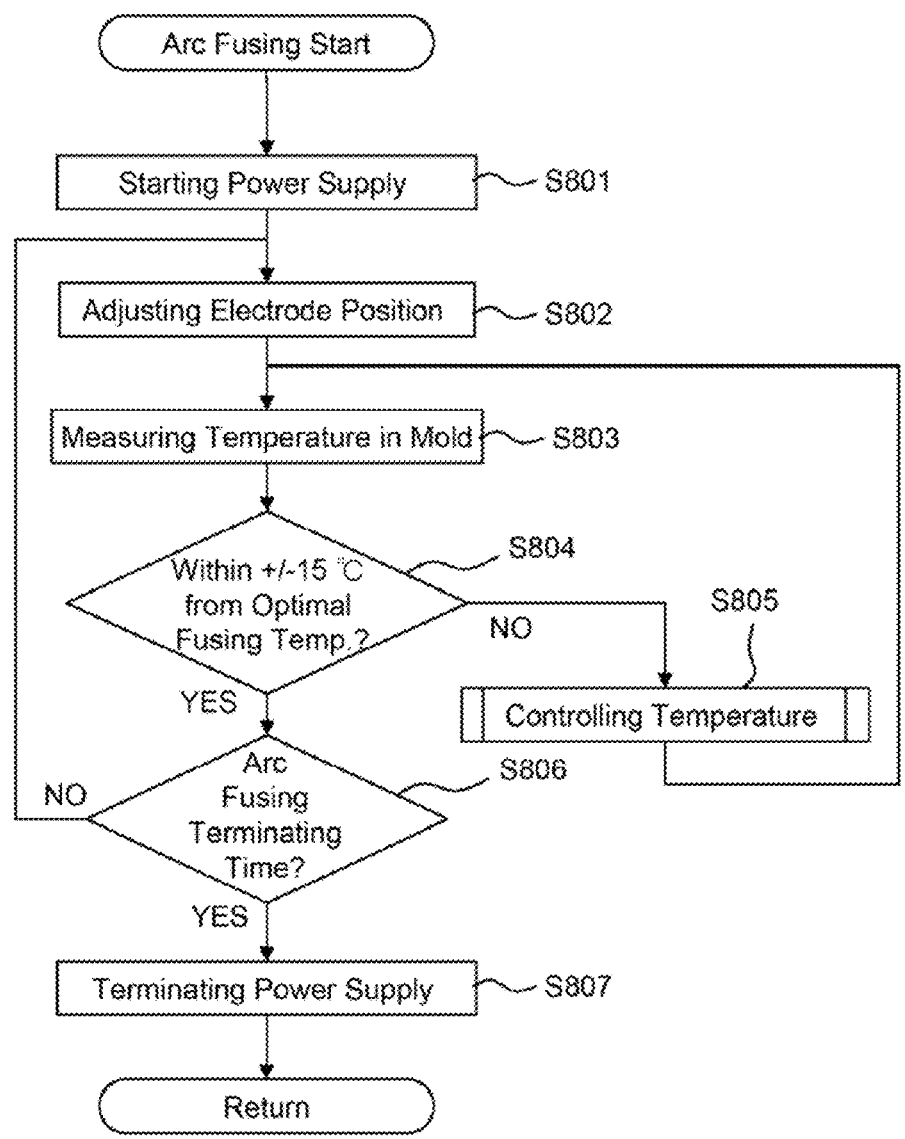
FIG. 8 is a flowchart showing an arc fusing process in the embodiment of a method of manufacturing a vitreous silica crucible, according to the present invention.
Figure 9:
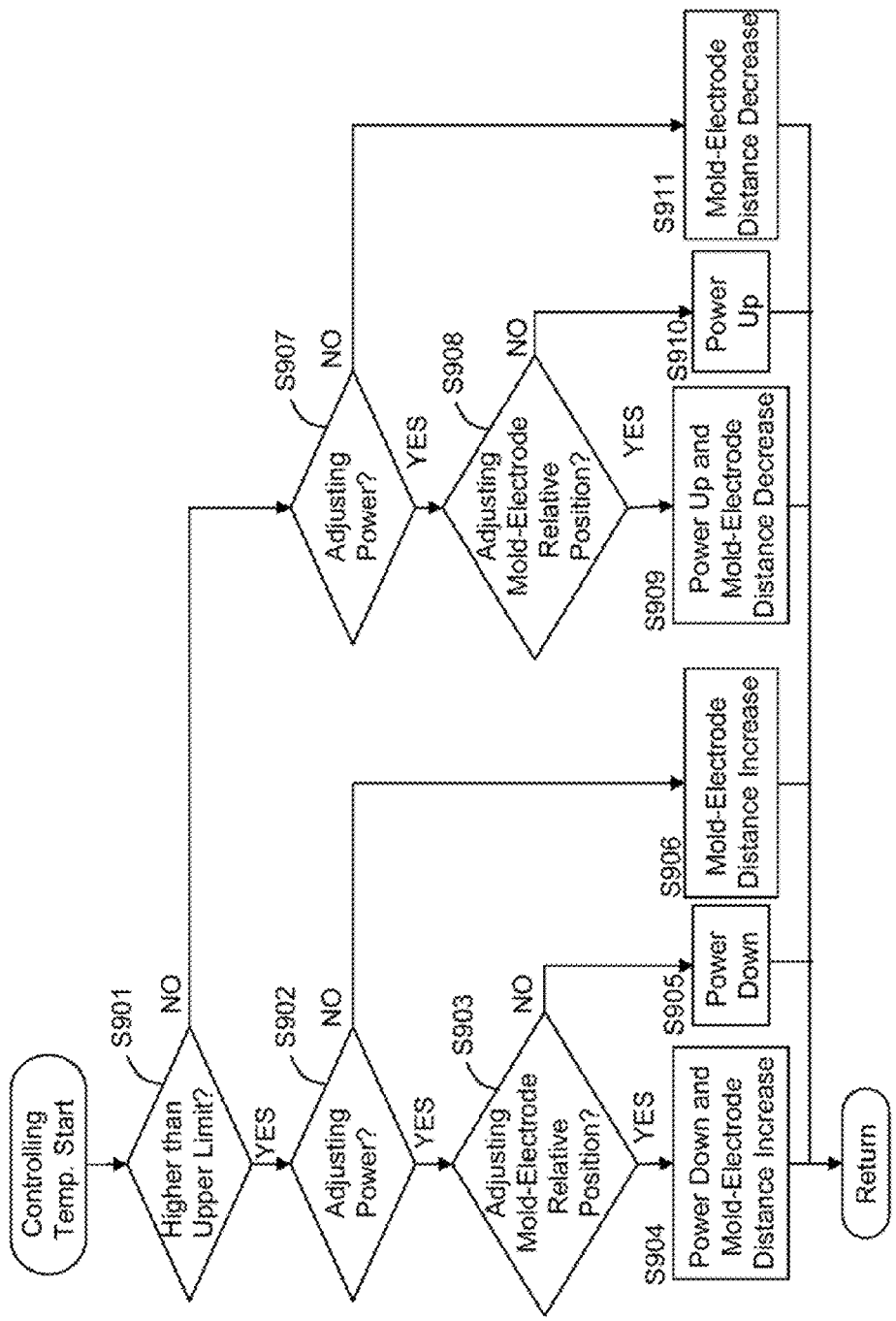
FIG. 9 is a flowchart showing a temperature controlling process in the embodiment of a method of manufacturing a vitreous silica crucible, according to the present invention.

FIGS. 7, 8, and 9 are flowcharts showing an example of the method of manufacturing a vitreous silica crucible according to the present embodiment.

According to the method, the vitreous silica crucible is manufactured by the rotating mold method by use of the apparatus for manufacturing a vitreous silica crucible as shown in FIG. 1. The method includes, as shown in FIG. 7, a silica powder supplying process (S701), an electrode initial position setting process (S702), an arc fusing process (S703), a cooling process (S704), a taking-out process (S705), and a finishing process (S706).

In the silica powder supplying process (S701), silica powder is deposited on the inner surface of the mold 10 to form a silica powder layer 11. The silica powder layer 11 is retained on the inner surface of the mold by the centrifugal force generated by the rotation of the mold 10.

In the electrode initial position setting process (S702) shown in FIGS. 1 and 2, the initial position of the carbon electrodes 13 is set by the electrode position setting unit 20 so that the carbon electrodes 13 form an inverse three-sided pyramid, each axis line 13L is directed to a direction so as to maintain an angle θ1, and the tips of the carbon electrodes 13 contact one another. In addition, an initial state of a mold-electrode relative position comprised of an electrode height position H which is a height dimension from the edge of the mold 10 to the electrode tips, or a position and an angle of an electrode position central axis (which is a central axis of an inverse three-sided pyramid formed by the carbon electrodes 13) and a rotation axis line of the mold 10 is also set.

In the arc fusing process (S703), the retained silica powder layer 11 is heated and fused by an arc discharge unit by adjusting positions of the electrodes 13 while depressurizing the silica powder layer 11 through ventilation passages 12, to form a vitreous silica layer.

Figure 10:
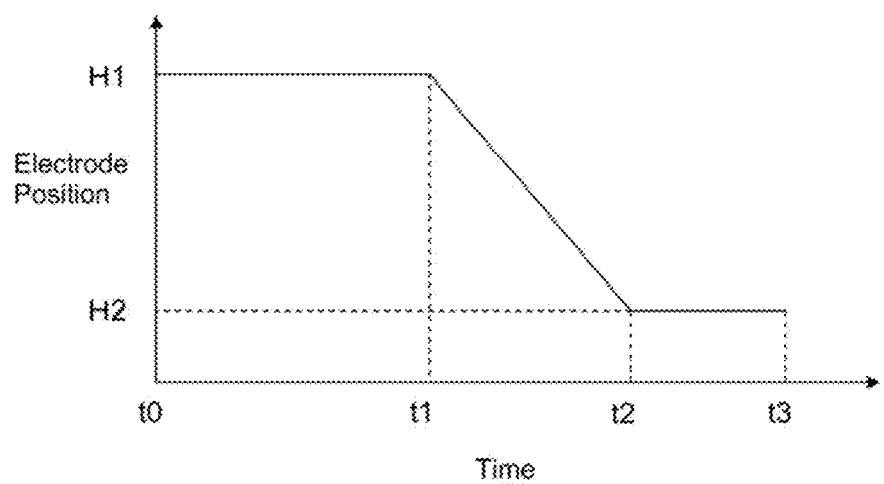
FIG. 10 is a graph showing a change of the height position of carbon electrodes in the embodiment of a method of manufacturing a vitreous silica crucible, according to the present invention.

In the arc fusing process (S703), the height position of the carbon electrodes 13 is varied, for example, as shown in FIG. 10. Specifically, the height position of the carbon electrodes 13 in the electrode initial position setting process (S702) is set to H1, and the power supply is started at time t0 (S801), and the height position is started to be lowered at time t1 (S802), the height is set to be H2 at time t2, and the power supply is terminated at time t3 (S807).

The arc fusing process (S703) includes a process of starting the power supply (S801), a process of adjusting the electrode position (S802), a process of measuring the temperature in the mold (S803), a process of judging whether the temperature in the mold is within +/−15 deg. C. from the optimal fusing temperature (S804), a process of controlling the temperature of the arc fused portion (S805), a process of judging whether the arc fusing terminating time has arrived (S806), and a process of terminating the power supply (S807). In the process of starting the power supply (S801), power is supplied to the carbon electrodes 13 in a predetermined amount from the power-supply unit (not shown). Arc discharge is not yet generated at this stage.

In the process of adjusting the electrode position (S802), the interelectrode distances D are enlarged by changing the angles of the carbon electrodes 13 while maintaining the inverse three-sided pyramid with a downward tip by the electrode position setting unit 20. Then, arc discharge starts to be generated between the carbon electrodes 13. Supplied power to each of the carbon electrodes 13 is controlled to be a power density of, for example, 40 kVA/cm$^2$ to 1700 kVA/cm$^2$ by the power-supply unit. Furthermore, the mold-electrode relative position, such as the electrode height position H, is set to satisfy conditions to be a heat source necessary for fusing of the silica powder layer 11 while maintaining the angles of θ1 by the electrode position setting unit 20.

In the process of measuring the temperature in the mold (S803), the radiation energy light from the surface of the silica powder layer 11 which is in the fused state is detected by the radiation thermometer Cam, and the temperature is measured based on the measurement result. Then, it is judged whether the temperature in the mold is within +/−15 deg. C. from the optimal fusing temperature (S804).

If the temperature is not within +/−15 deg. C., the temperature of the arc fused portion is controlled (S805). If the temperature is within +/−15 deg. C., it is judged whether the arc fusing terminating time has arrived (S806). If not, the arc fusing is continued, and the process from the S802 to S806 is repeated until the arc fusing terminating time has arrived. If the arc fusing terminating time has arrived, the power supply to the respective carbon electrodes 13 is terminated (S807), and the cooling process is carried out (S704).

In the process of controlling the temperature of the arc fused portion (S805), it is judged whether the temperature of the arc fused portion is higher than +15 deg. C. from the optimal fusing temperature (S901), whether the power is adjusted (S902 or S907) or whether the relative position of the mold and the electrodes is adjusted (S903 or S908).

When the temperature of the arc fused portion is higher than +15 deg. C. from the optimal fusing temperature, a) the power is turned down and the distance between the mold and the electrodes is increased (S904) or b) the power is turned down without changing the relative position of the mold and the electrodes (S905), or c) the distance between the mold and the electrodes is increased without changing the power (S906).

When the temperature of the arc fused portion is lower than −15 deg. C. from the optimal fusing temperature, d) the power is turned up and the distance between the mold and the electrodes is decreased (S909), or e) the power is turned up without changing the relative position of the mold and the electrodes (S910), or f) the distance between the mold and the electrodes is decreased without changing the power (S911). Here, either of the process of judging whether the power is adjusted or the process of judging the relative position is adjusted may be carried out first, or they can be carried out simultaneously.

The power may be supplied so as to adjust the power density at the carbon electrodes 13 to 40, 100, 500, 1000, 1500, or 1700 kVA/cm$^2$ or a value in the range between two values of the values exemplified here.

The distance between the mold and the electrodes can be increased by moving the electrode position away from the mold by the electrode position setting unit 20, or by moving the mold position away from the electrodes by the controller. The distance between the mold and the electrodes can be decreased by moving the electrode position toward the mold by the electrode position setting unit 20, or by moving the mold position toward the electrodes by the controller.

In the process of terminating the power supply (S807), the power supply by the power-supply unit is terminated when the silica powder layer 11 is fused to be a predetermined state. By this arc fusing, the silica powder layer is fused to manufacture a vitreous silica crucible. In the arc fusing process (S703), the rotation of the mold 10 is controlled by a controller (not shown).

In the cooling process (S704), after the power supply is terminated, the vitreous silica layer is cooled. In the taking-out process (S705), the cooled vitreous silica crucible is taken out of the mold 10. In the finishing process (S706), a honing process of spraying high-pressure water onto the outer surface of the crucible, a rim-cutting process of adjusting the crucible height to a predetermined dimension, and a washing process of washing the inner surface of the crucible with hydrofluoric acid are carried out. A vitreous silica crucible can be obtained by the processes above.

In the present embodiment, the temperature in the mold is measured by the temperature measurement unit in the arc fusing process (S703) and the cooling process (S704). The temperature may be measured from the process of starting the power supply (S801) up to before the taking-out process (S705). The temperature may be measured in only a portion of these processes.

FIG. 10 is a graph showing an example of a change of the height position of carbon electrodes in the embodiment of a method of manufacturing a vitreous silica crucible, according to the present embodiment.

Specifically, as shown in FIG. 10, the height position of the carbon electrodes 13 in the electrode initial position setting process (S702) is set to H1, and the power supply is started at time t0 (S801), and the height position is started to be lowered at time t1 (S802), the height is set to be H2 at time t2, and the power supply is terminated at time t3 (S807).

Figure 11:
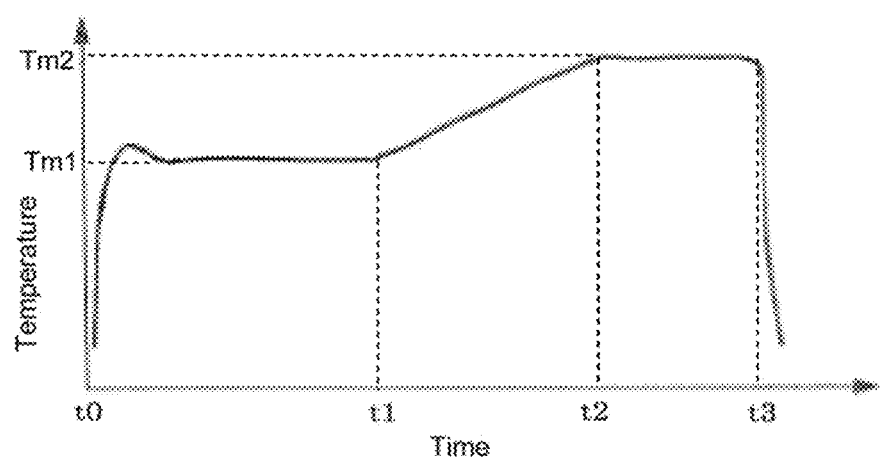
FIG. 11 is a graph showing a temperature change in the embodiment of a method of manufacturing a vitreous silica crucible, according to the present invention.

FIG. 11 shows a graph showing an example of the time-course change of the temperature measured by the temperature measurement unit. This graph does not have an abrupt change of the temperature, and thus has a smooth shape. This shows that the temperature in the arc fusing process is precisely controlled. Thus, according to the manufacturing method, it is possible to manufacture a high-quality vitreous silica crucible having little variation between production lots.

Figure 12:
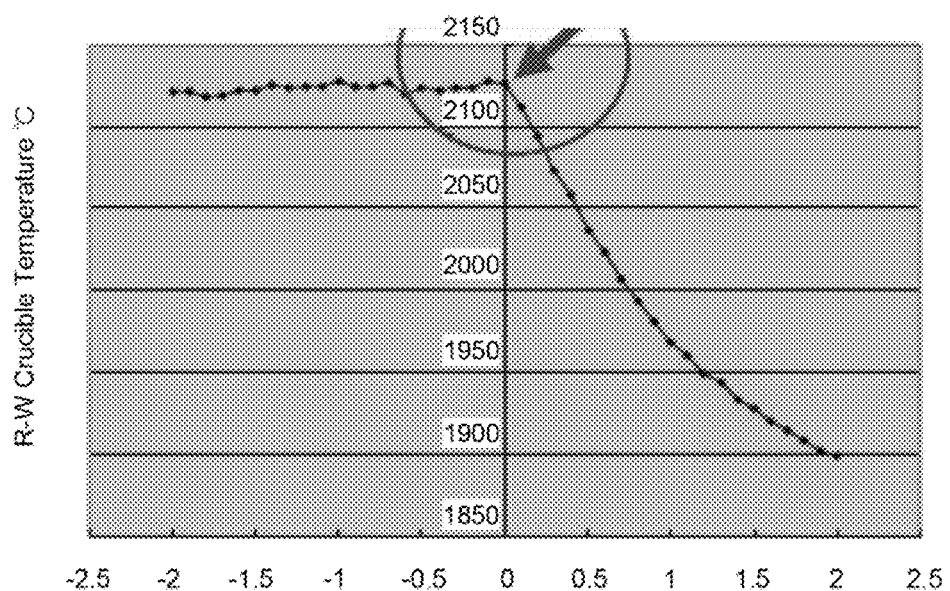
FIG. 12 is an enlarged graph showing the region near t3 in FIG. 11.
Figure 13:
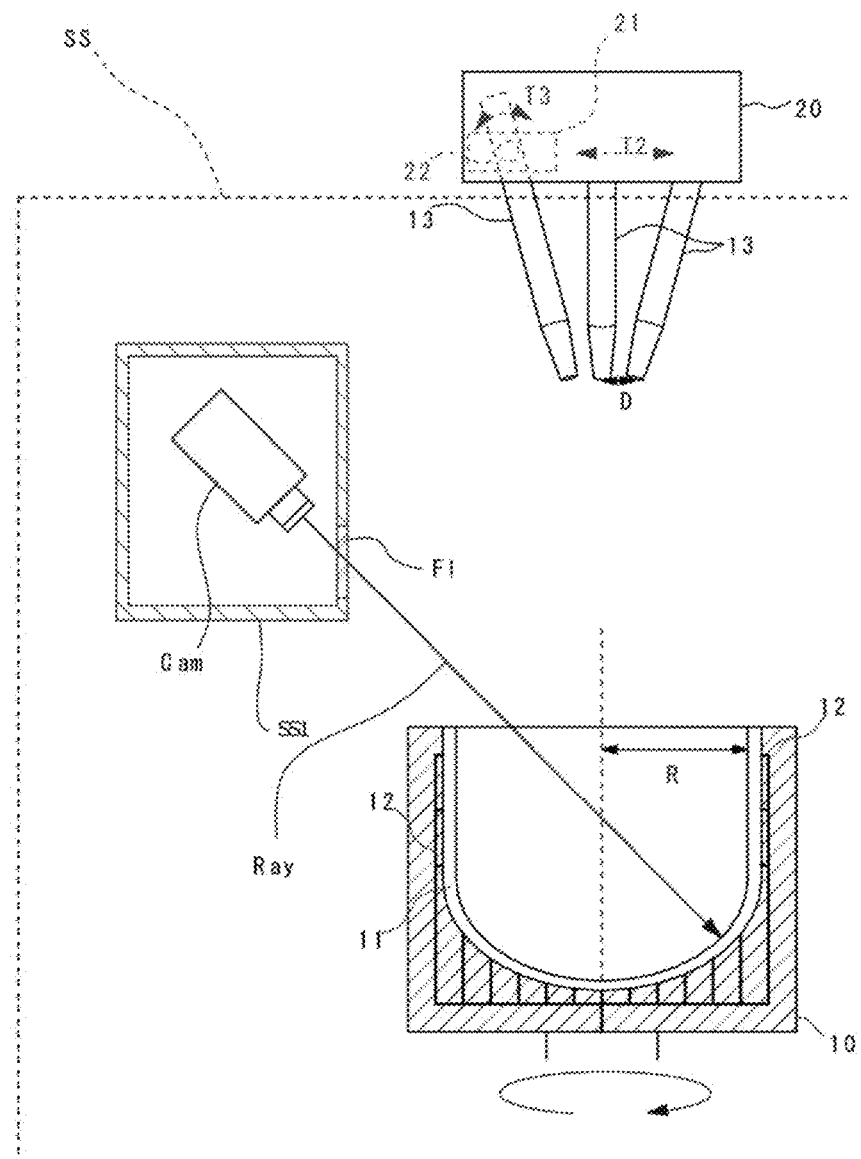
FIG. 13 is a schematic front view showing an embodiment where the radiation thermometer is accommodated in the shield SS1, according to the present invention.

FIG. 12 is an enlarged graph showing the temperature state at t3 of FIG. 11. FIG. 12 shows that the temperature of vitreous silica in the fused state in the mold is continuous before and after the termination of arc discharge, and this indicates that the temperature measurement according to the present embodiment is accurate.

In the present embodiment, the radiation thermometer, which is the temperature measurement unit, is provided on the outer side of the partition wall SS of the arc furnace. However, it may be provided inside a shield SS1 provided on the inner side of the partition wall SS. In this case, the shield SS1 is provided with a filter F1.

Up to here, the embodiments of the present invention have been described, but these embodiments are just examples of the present invention, and various modifications are possible. Configurations described in the aforementioned embodiments can be employed in combination.

EXAMPLE

Hereinafter, the present invention will be explained in more detail with reference to the examples. The present invention is not limited by these examples.

A vitreous silica crucible having a diameter of 610 mm (24 inches) was manufactured. Nine samples were manufactured according to the conditions of Examples 1 to 9 of Table 1, and two samples were manufactured according to the conditions of Comparative Examples 1 to 2. In the manufacturing, the height position H of the electrode tips 13a was subjected to time-course change as shown in FIG. 10 by the electrode position setting unit 20 shown in FIG. 1. The height position was H1 from time t0 to t1, and the height position was H2 from time t2 to t3 (H1>H2).

While manufacturing, the temperature at the position R-W shown in FIG. 4 was measured during arc fusing by use of a radiation thermometer, and the temperature control is carried out by the fine adjustment of the height position H and the supplied power so as to adjust the measured temperature to be +/−15 deg. C. from the preset optimal fusing temperature. In the arc fusing process, the arc fusing portion and the measuring point were matched by controlling the electrode position or the mold height position. The range of the temperature measurement was 400 to 2800 deg. C.

Furthermore, one sample was manufactured as Comparative Example 3 according to the aforementioned conditions except that the fine adjustment of the height position H and the supplied power were not carried out.

A silicon single crystal was pulled by use of thus manufactured vitreous silica crucible, and the single crystallization yield of the pulled ingot was measured, and the evaluation was carried out according to the following criteria. The result is shown in Table 1. The single crystallization yield was evaluated by visual inspection of crystal dislocation which can be seen from the shift of a crystal habit on the surface of a silicon single crystal ingot.

A (Excellent) Single crystallization yield was over 70%, and thus the crystal property was excellent.

B (Good) Single crystallization yield was 50 to 70%, and thus the crystal property was acceptable.

C (Poor) Single crystallization yield was 40 to 50%, and thus there were many crystal defects.

D (Particularly Poor) Single crystallization yield was less than 40%, and thus there were particularly many crystal defects.

TABLE 1

| | | Radiation Thermometer Wavelength (µm) | Filter | Measurement Diameter (mm) | Evaluation |
|---|---|---|---|---|---|
| Ex. | 1 | 4.8 | $BaF_2$ | 10 | A |
| | 2 | 4.8 | $CaF_2$ | 10 | A |
| | 3 | 4.8 | $BaF_2$ | 30 | A |
| | 4 | 4.8 | $CaF_2$ | 30 | A |
| | 5 | 5.2 | $BaF_2$ | 10 | A |
| | 6 | 5.2 | $CaF_2$ | 10 | A |
| | 7 | 5.2 | $BaF_2$ | 30 | A |
| | 8 | 5.2 | $CaF_2$ | 30 | A |
| | 9 | 4.8 | $BaF_2$ | 100 | B |
| Comp. Ex. | 1 | 4.0 | $BaF_2$ | 10 | C |
| | 2 | 6.0 | $BaF_2$ | 10 | D |
| | 3 | | | | C |

This result shows that it is possible to remarkably improve the efficiency of pulling a silicon single crystal by measuring the temperature based on the radiation energy of a wavelength of 4.8 to 5.2 µm, and carrying out feedback control based on the measurement. Furthermore, the present examples succeeded in accurately measuring the temperature even in ultra-high temperature during the arc fusing by detecting the radiation energy of a wavelength of 4.8 to 5.2 µm by use of a radiation thermometer.

This indicates that it has become possible to manufacture a vitreous silica crucible having a desired property by carrying out feedback control of the temperature in the arc fusing process. In contrast, in the conventional manufacturing method, it was not possible to accurately measure the temperature, and the arc fusing process was carried out according to a programmed current density, and thus it was not easy to manufacture a vitreous silica crucible having a desired property.

Furthermore, the temperature was measured while the mold was rotating. Therefore, the temperature measurement on one point was the temperature measurement on the circumference including the one point. Furthermore, in the present Example, the arc fusing portion and the measuring point were matched, and thus it was possible to precisely detect the temperature change which happened when the arc fusing conditions were adjusted.

Thus, it was possible to accurately measure the temperature in a severe condition during arc fusing in manufacturing a vitreous silica crucible whose inner surface property is desirable. This was first discovered by using a radiation thermometer detecting the radiation energy of a wavelength of 4.8 to 5.2 µm, and thus innovative.

In sum, the present invention has been explained with reference to Examples. It should be understood to those skilled in the art that the Examples are just examples, and various modifications are possible, and those modifications are within the scope of the present invention.

EXPLANATION OF REFERENCE SYMBOL

1 Vitreous Silica Crucible Manufacturing Apparatus
10 Mold
11 Silica Powder Layer
12 Ventilation Passage
13 Carbon Electrode
13a Electrode Tip
13L Axis Line
20 Electrode Position Setting Unit
21 Supporting Unit
22 Angle Set Axis
Cam Radiation Thermometer
SS Partition Wall
F1 Filter
SS1 Shield

What is claimed is:

1. A method of manufacturing a vitreous silica crucible comprising:
   a silica powder supplying process of supplying silica powder into a mold for molding a crucible, to form a silica powder layer; and
   an arc fusing process of arc fusing the silica powder layer by arc discharge generated by carbon electrodes;
   wherein
   at least the arc fusing process includes:
      a temperature measuring process of measuring temperature of a fused portion in the mold by detecting radiation energy of a wavelength of 4.8 to 5.2 μm by a temperature measurement unit which is a radiation thermometer, wherein the temperature measurement unit detects the radiation energy at only a corner portion of the vitreous silica crucible, the corner portion is a portion extending from a point where a curvature at a bottom portion of the vitreous silica crucible starts to change, to a point where the curvature changes to a curvature of a side wall portion, and the measurement diameter of the radiation thermometer at a measuring point of the corner portion is 30 mm or less, wherein the relative position of the mold and the carbon electrodes is changed to match the arc fusing portion of the silica powder layer and the temperature measuring point of the silica powder layer,
      a temperature judging process of judging whether the measured temperature is within a set difference from a predetermined optimal fusing temperature, and
      a temperature controlling process of controlling the temperature in the mold if the measured temperature is not within the set difference, by changing, according to the measurement result from the temperature measurement unit, the amount of current supplied to the carbon electrodes and the position of the carbon electrodes, wherein if the measured temperature is within the set difference, the temperature controlling process determines whether a set time for the arc fusing process elapses.

2. The method of claim 1, wherein, in the temperature measurement process, the temperature measurement unit measures the temperature through a filter made of $BaF_2$ or $CaF_2$.

3. The method of claim 1, wherein, in the temperature measurement process, the range of the measuring temperature of the temperature measurement unit is set to be 400 to 2800 deg. C.

4. The method of claim 1, wherein the set difference is ±15 deg. C of the predetermined optimal fusing temperature.

* * * * *